United States Patent
Barabash et al.

(10) Patent No.: US 9,894,144 B2
(45) Date of Patent: Feb. 13, 2018

(54) APPLICATION LEVEL MIRRORING IN DISTRIBUTED OVERLAY VIRTUAL NETWORKS

(71) Applicant: International Business Machines Corporation, Armonk, NY (US)

(72) Inventors: Katherine Barabash, Haifa (IL); Vinit Jain, Austin, TX (US); Matthew J Sheard, Morrisville (NZ)

(73) Assignee: International Business Machines Corporation, Armonk, NY (US)

( * ) Notice: Subject to any disclaimer, the term of this patent is extended or adjusted under 35 U.S.C. 154(b) by 700 days.

(21) Appl. No.: 14/150,781

(22) Filed: Jan. 9, 2014

(65) Prior Publication Data

US 2015/0195343 A1    Jul. 9, 2015

(51) Int. Cl.
| | |
|---|---|
| *G06F 15/16* | (2006.01) |
| *H04L 29/08* | (2006.01) |
| *H04L 12/24* | (2006.01) |
| *H04L 29/12* | (2006.01) |

(52) U.S. Cl.
CPC .......... *H04L 67/10* (2013.01); *H04L 41/0893* (2013.01); *H04L 41/0896* (2013.01); *H04L 67/1095* (2013.01); *H04L 41/5096* (2013.01); *H04L 61/2007* (2013.01)

(58) Field of Classification Search
CPC ..... H04L 67/10; H04L 41/00; H04L 61/2007; H04L 67/1095
See application file for complete search history.

(56) References Cited

U.S. PATENT DOCUMENTS

| | | | | |
|---|---|---|---|---|
| 6,112,257 A | * | 8/2000 | Mason, Jr. .......... | G06F 11/2066 710/18 |
| 7,702,850 B2 | * | 4/2010 | Ludwig ................ | G06F 3/0607 711/114 |
| 8,151,263 B1 | | 4/2012 | Venkitachalam et al. | |
| 8,255,484 B2 | | 8/2012 | Khandekar et al. | |
| 2010/0174811 A1 | * | 7/2010 | Musiri ................ | G06F 15/173 709/223 |
| 2011/0134925 A1 | * | 6/2011 | Safrai .................. | H04L 49/35 370/395.53 |

(Continued)

*Primary Examiner* — Brian Whipple
(74) *Attorney, Agent, or Firm* — Peter J. Edwards

(57) ABSTRACT

Systems and methods for managing mirroring communication between virtual network clients in a distributed overlay virtual network are provided. The method comprises utilization of controlled overlay virtualization infrastructure to facilitate communication between mirrored network clients. The system comprises a source mirrored network client hosted on a first physical port, a target mirrored network client hosted on a second physical port, a first overlay termination point, a second overlay termination point and a network controller. For a set of mirrored network clients, a logical mirror virtual network address is reserved. The controller is extended to contain mapping between the logical mirror network address and a set of virtual network addresses of mirrored clients. The network controller translates the logical mirror virtual network address to a set of destination virtual network addresses of mirrored clients and allows the modified packets to be sent to a set of second virtual network clients.

17 Claims, 6 Drawing Sheets

(56) References Cited

U.S. PATENT DOCUMENTS

| | | | | |
|---|---|---|---|---|
| 2011/0255540 A1* | 10/2011 | Mizrahi | .................. | H04L 45/00 370/392 |
| 2012/0246641 A1* | 9/2012 | Gehrmann | .............. | G06F 9/445 718/1 |
| 2014/0098815 A1* | 4/2014 | Mishra | .................. | H04L 45/021 370/390 |
| 2014/0192804 A1* | 7/2014 | Ghanwani | ............... | H04L 49/70 370/390 |
| 2014/0280829 A1* | 9/2014 | Kjendal | ............... | H04L 43/028 709/223 |

* cited by examiner

APPLICATION LEVEL MIRRORING IN DISTRIBUTED OVERLAY VIRTUAL NETWORKS

COPYRIGHT & TRADEMARK NOTICES

A portion of the disclosure of this patent document may contain material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

TECHNICAL FIELD

The disclosed subject matter relates generally to the mirrored deployment of multi-component networked applications and, more particularly, to a system and method for enabling and managing communication between mirrored components in a distributed overlay virtual network.

BACKGROUND

A multi-component networked application generally refers to an application with multiple interconnected components that communicate over one or more networks according to specific rules. Virtualization techniques may be employed for rapid provisioning of multiple instances of multi-component applications and their individual components to achieve use cases such as elastic services, disaster recovery, cloning, migration and application-level mirroring. Typically, newly installed or cloned components need to be modified for specific use. Such modification is associated with substantial configuration management with the risk of introducing added overheads and human error. In particular, in order to achieve application-level mirroring, active modification and customization of the mirrored copies is required, so that all the copies are updated with proper network addresses.

Snapshot-based techniques may be used to manage the configuration and updating of mirrored copies across the network by way of, for example, cloning a component or resource such as a virtual machine, while the virtual machine continues to run. This model requires virtualization software to be executed between the system hardware and the virtual machine. In addition, the virtualization software utilizes the resources of the system hardware, thereby degrading performance of the system. This model also requires the execution of a script in the virtualization software or in the guest operating system to perform the cloning operation. Finally, this model requires continuous snapshoting, consuming a great deal of network bandwidth.

One other technique to achieve a mirrored configuration is to install and configure a new virtual machine according to user specifications and to then deploy the virtual machine on a chosen physical host. This model requires installation of operating system and additional software applications to the virtual machine, which in turn degrades performance of the computer system. Also, the system requires periodic maintenance and updates, increasing the risk of operational errors. In addition, this technique employs heuristics to configure the virtual machine that best matches the user specifications, resulting in heuristic evaluations that require additional maintenance and knowledge of software resources.

One additional technique may be to clone one of the existing virtual machines in the mirrored tier and then customize it to differentiate it from other copies. Although the above-mentioned techniques provide for quick deployment of mirrored copies, the requirement to customize the new copy might be time consuming and error-prone. Moreover, customizing all the existing copies in the mirrored tier may be required to create the operational configuration.

SUMMARY

For purposes of summarizing, certain aspects, advantages, and novel features have been described herein. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

In accordance with one embodiment, machines, systems and methods for enabling and managing mirroring communication between virtual network clients in a distributed overlay virtual network are provided. The method comprises utilization of controlled overlay virtualization infrastructure to facilitate communication between mirrored network clients. The system comprises a source mirrored network client hosted on a first physical port, a target mirrored network client hosted on a second physical port, a first overlay termination point, a second overlay termination point and a network controller. For a set of mirrored network clients, a separate set of logical mirror virtual network addresses is reserved. The controller is extended to contain mapping between the logical mirror network address and a set of virtual network addresses of mirrored clients. The network controller translates the logical mirror virtual network address to a set of destination virtual network addresses of mirrored clients and allows the modified packets to be sent to a set of second virtual network clients.

In accordance with one or more embodiments, a system comprising one or more virtual network clients is provided. The one or more overlay termination points and the centralized network controller are configured and updated to perform the functions and operations associated with the above-disclosed methods. In yet another embodiment, a computer program product comprising a computer readable storage medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The disclosed subject matter is not, however, limited to any particular embodiment disclosed.

BRIEF DESCRIPTION OF THE DRAWINGS

The disclosed embodiments may be better understood by referring to the figures in the attached drawings, as provided below.

Features, elements, and aspects that are referenced by the same numerals in different figures represent the same, equivalent, or similar features, elements, or aspects, in accordance with one or more embodiments.

DETAILED DESCRIPTION OF EXAMPLE EMBODIMENTS

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

In accordance with one embodiment, a method for enabling and managing communication between virtual network clients in a distributed overlay virtual network is proposed. The method may utilize a centralized network controller to facilitate communication between virtual network clients. In one implementation, the method may utilize a distributed overlay virtual Ethernet (DOVE) infrastructure and DOVE policy service to facilitate communication between virtual network clients.

Figure 1:
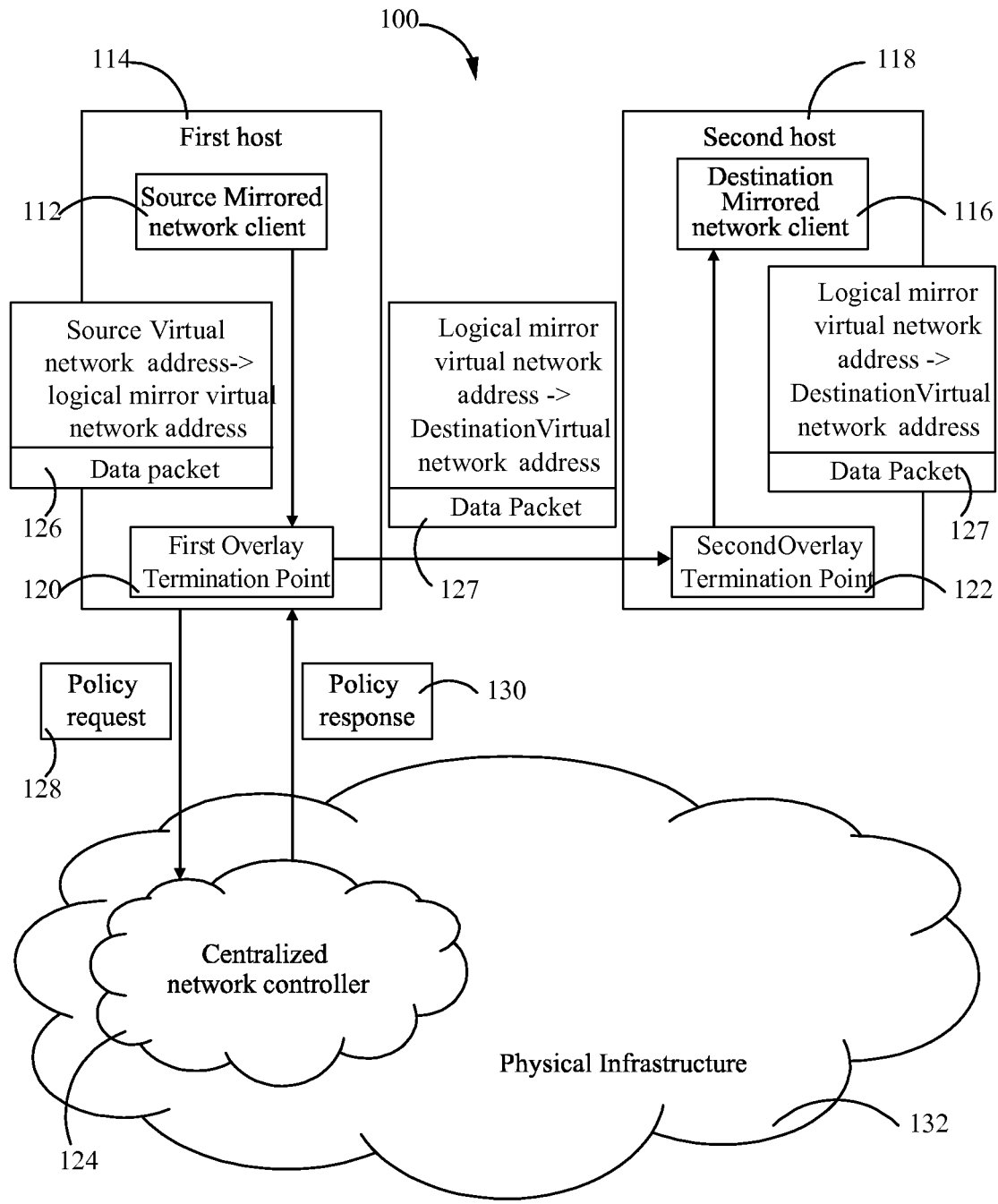
FIG. 1 illustrates an exemplary block diagram of a system for enabling and managing communication between virtual network clients in a mirrored network tier in accordance with one or more embodiments.

Referring to FIG. 1, a block diagram of a system 100 for enabling and managing communication between mirrored network clients in a mirrored network tier in accordance with one or more embodiments is illustrated. System 100 may comprise a source mirrored network client 112 running on a first host 114, a destination mirrored network client 116 running on a second host 118, a first overlay termination point 120 associated with the source mirrored network client 112, a second overlay termination point 122 associated with the destination mirrored network client 116 and a centralized network controller 124 configured to manage and control the mirrored network tier. The system 100 may utilize physical infrastructure 132 of the mirrored network tier to facilitate communication between the mirrored network clients.

In accordance with one embodiment, the destination mirrored network client 116 may be a mirror copy of the source mirrored network client 112. The source mirrored network client 112 may be assigned with a source virtual network address and the destination mirrored network client 116 may be assigned with a destination virtual network address. Similarly, the first overlay termination point 120 may be assigned with a first physical network address and the second overlay termination point 122 may be assigned with a second physical network address. The first overlay termination point 120 is configured to serve the source mirrored network client and is deployed over the first host 114. The second overlay termination point 122 is configured to serve the destination mirrored network client and is deployed over the second host 118. The first overlay termination point 120 may be implemented to intercept and handle packet header rewriting and traffic from the source mirrored virtual network client 112. Similarly, the second overlay termination point 122 may be implemented to intercept and handle traffic to the destination mirrored virtual network client 116.

In accordance with one embodiment, the source mirrored virtual network client 112 may be configured to submit a data packet 126 to the first overlay termination point 120. The data packet 126 is then targeted to the logical network address of the mirrored network clients. The data packet 126 includes header information, which indicates that the data packet is sent from the source mirrored network client 112 and is destined for the logical mirror address. The first overlay termination point 120 may be implemented to receive the data packet 126 from the source network client 112 and submit a policy request 128 to the centralized network controller 124. The policy request 128 includes the identifier of the logical (virtual) network that the source mirrored virtual network client 112 belongs to, and a subset of the information included by the source mirrored virtual network client 112 in the header of the data packet 126 (e.g., the source and the destination virtual network addresses of the data packet).

The centralized network controller 124 may comprise data structures that provide, for a virtual network client, associations between the virtual network addresses of the virtual network client and the physical network addresses of the hosting overlay termination points. In addition to these data structures, the centralized network controller 124 may include a data structure (e.g., a translation table, a lookup table, a mapping database) with one or more records (e.g., mapping data) that provide an association between the logical mirror address and the list of virtual network addresses of the virtual network clients participating in the virtual mirrored cluster identified by this logical mirror address. It is noteworthy that, in one implementation, the logical mirror address may not belong to a specific virtual network client. Rather, the logical mirror address may belong to the whole network application and may identify a set of virtual network clients that together constitute a mirrored application tier, such that the mirror is a set of virtual network clients and is identified in the virtual network by a single logical IP address used as a destination IP for all the mirroring communications.

Based on the information in the policy request 128 received from the first overlay termination point 120, and the information stored in the data structures in centralized network controller 124, the centralized network controller 124 may determine the second virtual network address of the destination mirrored virtual network client 116 and the second physical network address for the second overlay termination point 122 on which the destination mirrored virtual network client 116 may be running In one implementation, upon receiving the policy request 128 from the first overlay termination point 120, the centralized network controller 124 may generate a policy response 130 so as to allow the first overlay termination point 120 to route the data packet 126 to the second overlay termination point 122. In transit, the data packet 127 is targeted to the destination virtual network address of the destination mirrored network client 116. The second overlay termination point 122 may be implemented to receive the data packet 127 from the first overlay termination point 120 and submit the data packet 127 to the destination mirrored network client 116.

In accordance with one embodiment, the source mirrored network client 112 and the destination mirrored network client 116 may be located in different geo-locations. Similarly, the first overlay termination point 120 and the second overlay termination point 122 may also be located in different geo-locations. The system 100 allows deployment of multiple mirrored network tiers each comprising multiple mirrored network clients over the distributed virtual network environment.

Figure 2A:
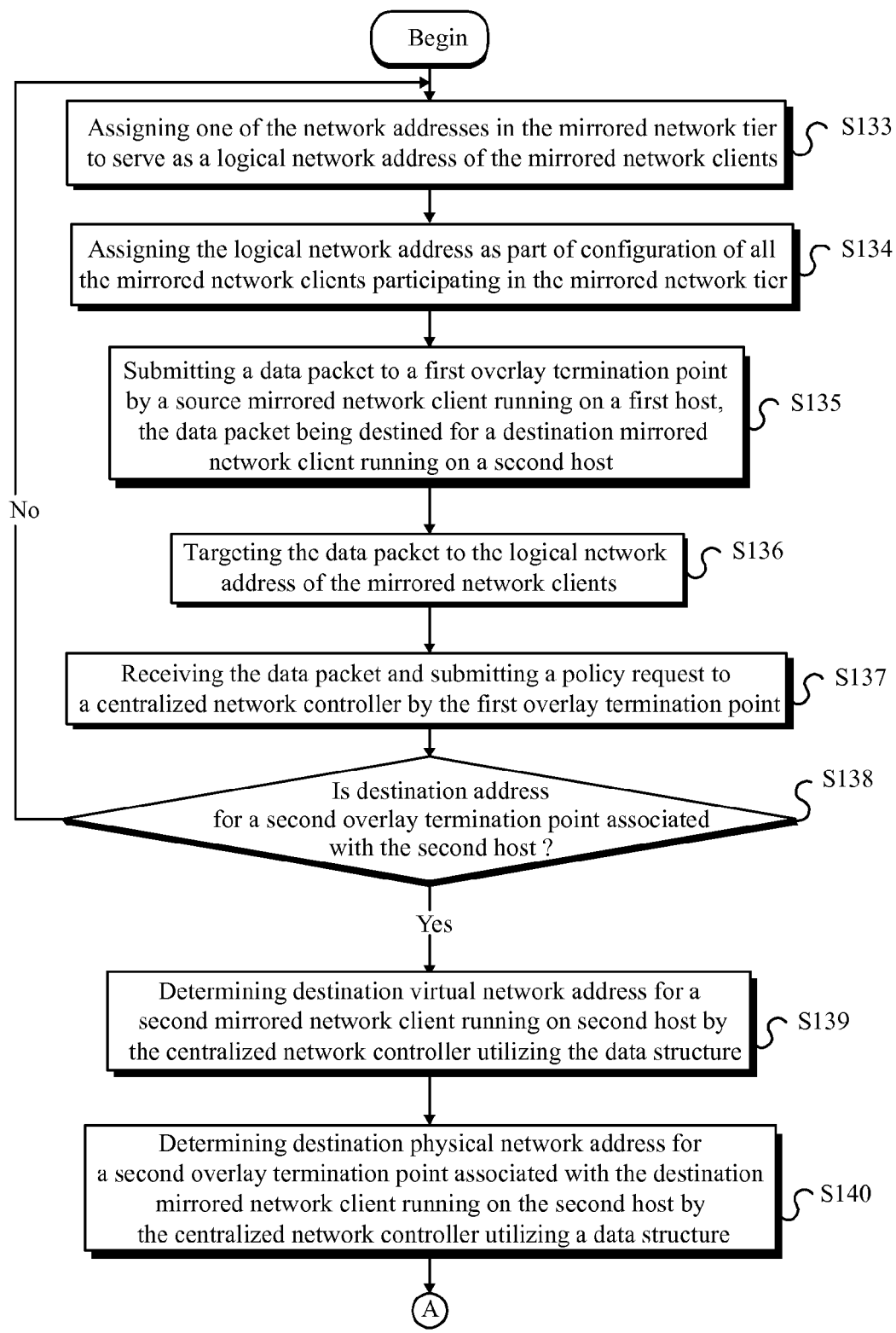
FIGS. 2A and 2B illustrate a flow diagram of an exemplary method for enabling and managing communication between virtual network clients in a mirrored network tier in accordance with one or more embodiments.
Figure 2B:
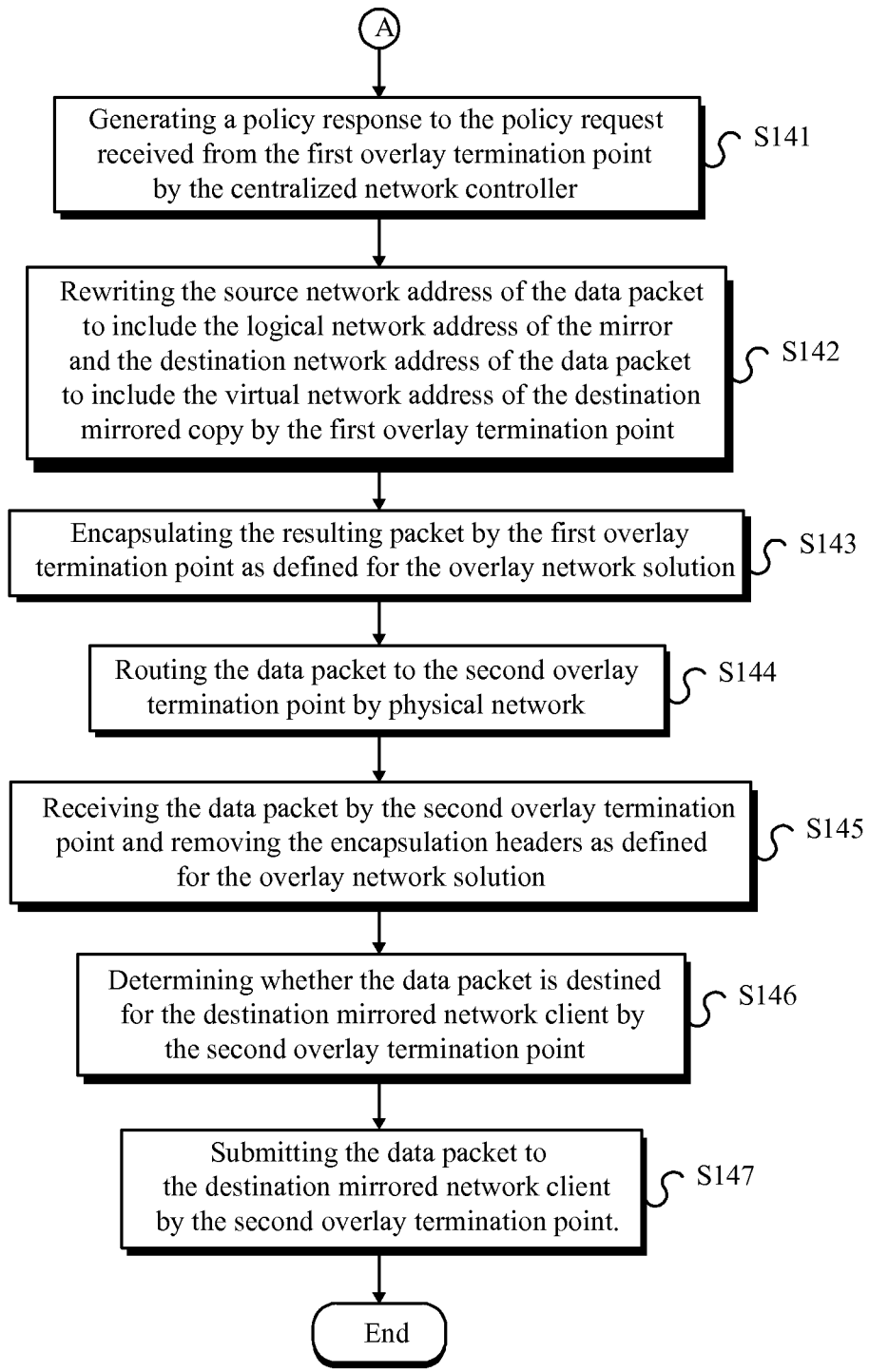

Referring to FIG. 2, in accordance with one or more embodiment, one of the network addresses in the mirrored network tier may be assigned to serve as a logical network address of the mirrored network clients (S133). The logical network address may be assigned as part of configuration of the mirrored network clients participating in the mirrored network tier (S134). The data packet may be submitted to a first overlay termination point by a source mirrored network client running on a first host (S135). The data packet is targeted to the logical network address of the mirrored network clients (S136). The data packet may be received and a policy request may be submitted to a centralized network controller by the first overlay termination point (S137).

When the policy request is received by the centralized network controller 124, the destination physical network address for a second overlay termination point associated with the destination mirrored network client running on the second host is determined according to information stored in the policy request and the data structure accessible by the centralized network controller. The data structure includes data that provides a correlation between the logical mirror virtual network address and the destination virtual network address of a second overlay termination point associated with the destination mirrored network client 116 (S138). The centralized network controller may determine whether the destination address for a second overlay termination point is associated with the second host (S139). The destination virtual network address for a second mirrored network client running on second host may be determined by the centralized network controller utilizing based on the information stored in the data structure (S140).

If the destination address is associated with the second host, a policy response 130 may be generated by the centralized network controller (S141). The source network address of the data packet is rewritten to include the logical network address of the mirror and the destination network address of the data packet to include the virtual network address of the destination mirrored copy by the first overlay termination point (S142). The resulting packet may be encapsulated by the first overlay termination point as defined for the overlay network solution (S143).

The data packet may be then routed to the second overlay termination point 122 by physical network (S144). The data packet may be received by the second overlay termination point 122 and the encapsulation headers may be removed as defined for the overlay network solution (S145). The second overlay termination point 122 may determine whether the data packet is destined for the destination mirrored network client 116 (S146). The data packet may be submitted to the destination mirrored virtual network client 116 by the second overlay termination point 122 (S147).

In accordance with a more detailed example embodiment, without limitation, the centralized network controller 124 is optionally a software defined networking controller (SDNC). The system 100 may be configured to achieve mirroring of virtual network clients utilizing a separate virtual network address, referred to herein as a logical mirror virtual network address (LMVNA). Application components participating in one or more embodiments of the mirrored clusters may be configured to use the assigned LMVNA to send the data packets to destinations that are the mirrored components of the source client. SDNC includes data structures that are extended to hold a mapping for an LMVNA containing a set of virtual network addresses of the virtual network clients participating in the mirrored cluster.

Accordingly, in the transmission of mirroring traffic between the virtual network clients, for mirroring cluster participants, logical mirror virtual network address may be replaced by the destination virtual network address. The mirroring traffic may thus be extended as follows: The source network client 112 may submit the data packet 126 to the first overlay termination point 120. The data packet 126 may include header information that indicates the data packet may be sent from the source virtual network client 112 and may be destined for the LMVNA. The first overlay termination point 120 may receive the data packet 126 and submits the policy request 128 to the SDNC. The SDNC may then resolve the LMVNA into a list of overlay virtual network addresses.

The SDNC then instructs the first overlay termination point 120 to replace the data packet 126 with a number of new packets, such that for example one new packet is generated for one or more overlay virtual network addresses in the list of overlay virtual network addresses, so that the packet is multiplexed to the members of the mirrored cluster . . . . New packets are created by rewriting the original source virtual network address header from the source network client 112 to logical LMVNA and then by rewriting the destination mirrored network address from the LMVNA to one of the destination mirrored network address in the list. Finally, each data packet may be encapsulated with overlay network address header indicating the first overlay physical network address of the first overlay termination point 120 and second physical network address of the second overlay termination point 122.

Figure 3:
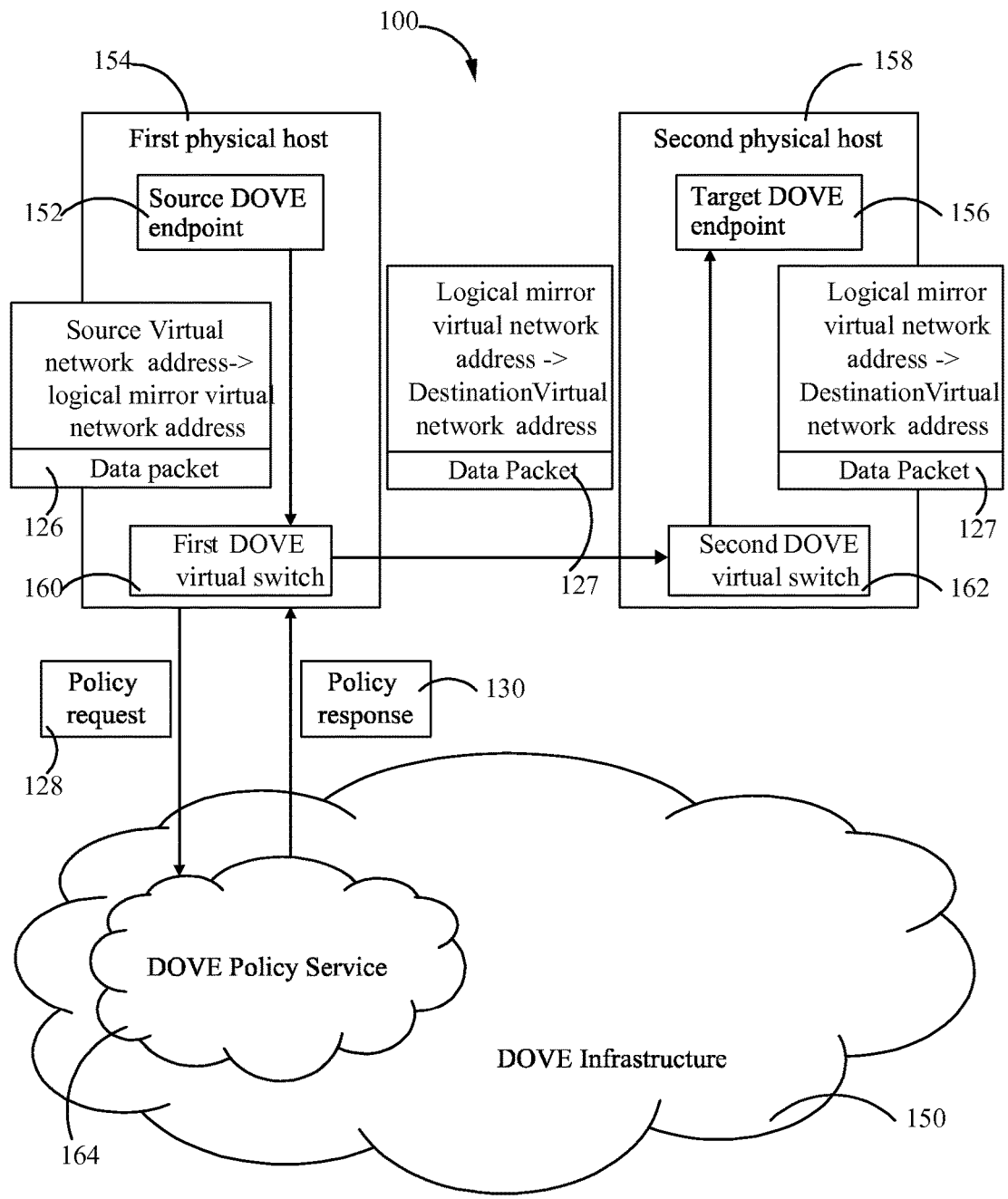
FIG. 3 illustrates an exemplary block diagram of a system for enabling and managing communication between virtual network clients in the context of a distributed overlay virtual network (DOVE) network, in accordance with one embodiment.

Referring to FIG. 3, an exemplary block diagram of the system 100 for enabling and managing communication between virtual network clients in a distributed overlay virtual network (DOVE), in accordance with one embodiment is illustrated. This embodiment illustrates the utilization of DOVE infrastructure 150 to facilitate communication between virtual network clients in a distributed overlay virtual network. Here, the virtual network clients may be modeled as DOVE endpoints belonging to DOVE virtual groups (DVG) or DOVE Policy Domains. Also, the overlay termination points may be modeled as DOVE virtual switches. In one implementation, the system 100 comprises a source DOVE endpoint 152 hosted on a first physical host 154, a target DOVE endpoint 156 hosted on a second physical host 158, a first DOVE virtual switch 160, a second DOVE virtual switch 162 and a DOVE Policy Service 164, which may be the centralized network controller of DOVE.

The DVGs with mirroring may be marked and for a set of mirrored DVGs, a separate set of virtual network addresses may be reserved for mirroring and may be designated as logical mirror virtual network address (LMVNA). The logical mirror virtual network address may be selected from a set of virtual network addresses assigned to the DOVE domain and not assigned to any virtual network client as its virtual network address. In addition, for a configured mirroring DVG, a set of DOVE endpoints belonging to DVGs participating in the mirroring may be marked as such and their virtual network addresses may be collected.

DOVE policy service 164 may be extended to contain a mapping between each configured logical mirror network address and a set of virtual network addresses of DOVE endpoints belonging to mirrored cluster in which that logical mirror virtual network address may be designated. The Dove policy service 164 may be configured to translate the logical mirror virtual network address to source virtual network address of mirroring DVG and allow the modified packets to be sent to the second DOVE virtual switch 162. Alternately, the DOVE endpoints may have the same virtual network address, in which the DOVE endpoints have exactly the same network configuration and thus new the mirroring endpoints may be created by cloning existing ones.

Advantageously, in accordance with one embodiment, two mirrored endpoints may be thought as a single domain or as different domains. For security reasons, there may be a need to scope the addresses used for mirroring to the context of a pair of mirrored domains. This may be achieved by either defining a cross domain DVG for mirroring or by fencing two domains mirrored inside a higher level isolation entity (e.g. tenant) Thus, when an application component instance may be created in a context of mirrored DVG, it may be deployed twice, once in each copy of the mirrored setup, for example.

Accordingly, in the virtualization of mirrored endpoints, for enabling the transmission of mirroring traffic between the virtual network clients, the logical virtual network address may be utilized as destination address in the mirroring cluster participants. This method allows the deployment of mirrored endpoints over the distributed overlay virtual network in an expedited manner, since the intelligence for routing the data packets to mirrored virtual network clients may be centrally controlled and configured in a secure manner.

The system 100 may be further employed for creating and growing the mirrored application clusters using mirrored copies of the already provisioned instances to achieve different mirrored setups, while reducing the amount of the configuration required by eliminating the virtual network address related customization. Finally, the system 100 may be utilized to achieve rapid provisioning of multiple application instances that are transparently added to the mirrored configuration, by leveraging the powers of the centralized network controller 124.

References in this specification to "an embodiment", "one embodiment", "one or more embodiments" or the like, mean that the particular element, feature, structure or characteristic being described may be included in at least one embodiment of the disclosed subject matter. Occurrences of such phrases in this specification should not be particularly construed as referring to the same embodiment, nor should such phrases be interpreted as referring to embodiments that are mutually exclusive with respect to the discussed features or elements.

In different embodiments, the claimed subject matter may be implemented as a combination of both hardware and software elements, or alternatively either entirely in the form of hardware or entirely in the form of software. Further, computing systems and program software disclosed herein may comprise a controlled computing environment that may be presented in terms of hardware components or logic code executed to perform methods and processes that achieve the results contemplated herein. Said methods and processes, when performed by a general purpose computing system or machine, convert the general purpose machine to a specific purpose machine.

Figure 4A:
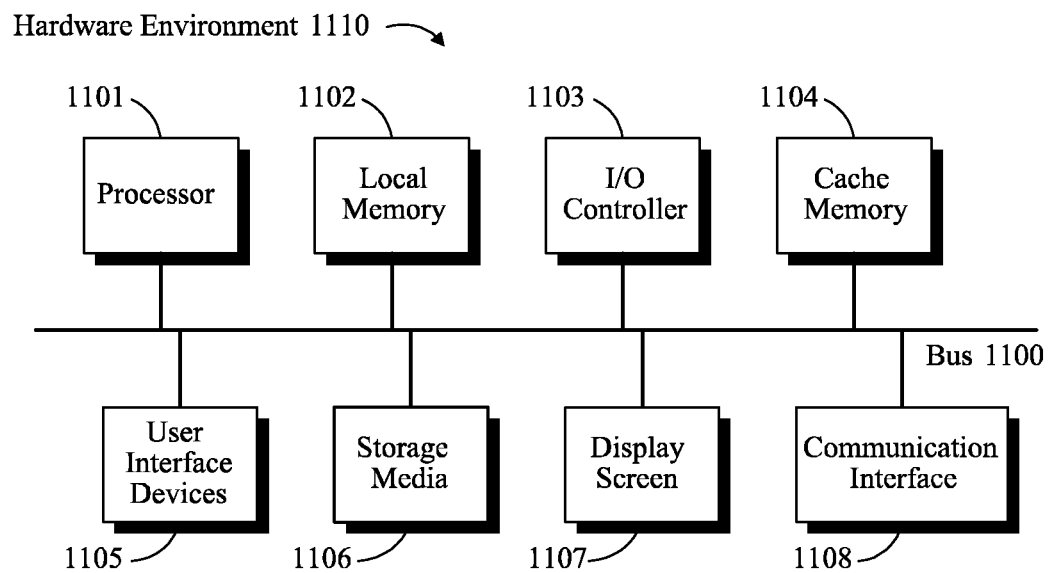
FIGS. 4A and 4B are block diagrams of hardware and software environments in which the disclosed systems and methods may operate, in accordance with one or more embodiments.
Figure 4B:
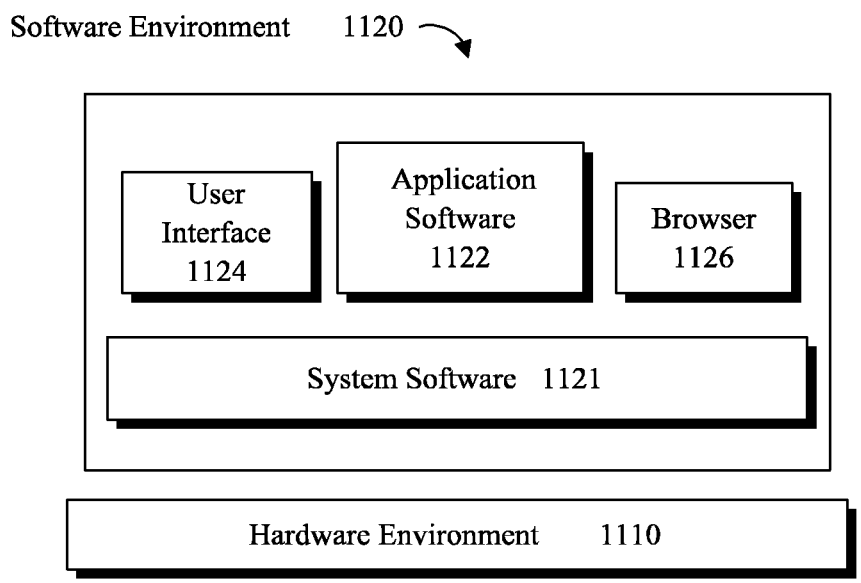

Referring to FIGS. 4A and 4B, a computing system environment in accordance with an exemplary embodiment may be composed of a hardware environment 1110 and a software environment 1120. The hardware environment 1110 may comprise logic units, circuits or other machinery and equipments that provide an execution environment for the components of software environment 1120. In turn, the software environment 1120 may provide the execution instructions, including the underlying operational settings and configurations, for the various components of hardware environment 1110.

Referring to FIG. 4A, the application software and logic code disclosed herein may be implemented in the form of machine readable code executed over one or more computing systems represented by the exemplary hardware environment 1110. As illustrated, hardware environment 110 may comprise a processor 1101 coupled to one or more storage elements by way of a system bus 1100. The storage elements, for example, may comprise local memory 1102, storage media 1106, cache memory 1104 or other machine-usable or computer readable media. Within the context of this disclosure, a machine usable or computer readable storage medium may include any recordable article that may be utilized to contain, store, communicate, propagate or transport program code.

A computer readable storage medium may be an electronic, magnetic, optical, electromagnetic, infrared, or semiconductor medium, system, apparatus or device. The computer readable storage medium may also be implemented in a propagation medium, without limitation, to the extent that such implementation is deemed statutory subject matter. Examples of a computer readable storage medium may include a semiconductor or solid-state memory, magnetic tape, a removable computer diskette, a random access memory (RAM), a read-only memory (ROM), a rigid magnetic disk, an optical disk, or a carrier wave, where appropriate. Current examples of optical disks include compact disk, read only memory (CD-ROM), compact disk read/write (CD-R/W), digital video disk (DVD), high definition video disk (HD-DVD) or Blue-ray™ disk.

In one embodiment, processor 1101 loads executable code from storage media 1106 to local memory 1102. Cache memory 1104 optimizes processing time by providing temporary storage that helps reduce the number of times code is loaded for execution. One or more user interface devices 1105 (e.g., keyboard, pointing device, etc.) and a display screen 1107 may be coupled to the other elements in the hardware environment 1110 either directly or through an intervening I/O controller 1103, for example. A communication interface unit 1108, such as a network adapter, may be provided to enable the hardware environment 1110 to communicate with local or remotely located computing systems, printers and storage devices via intervening private or public networks (e.g., the Internet). Wired or wireless modems and Ethernet cards are a few of the exemplary types of network adapters.

It is noteworthy that hardware environment 1110, in certain implementations, may not include some or all the above components, or may comprise additional components to provide supplemental functionality or utility. Depending on the contemplated use and configuration, hardware environment 1110 may be a machine such as a desktop or a laptop computer, or other computing device optionally embodied in an embedded system such as a set-top box, a personal digital assistant (PDA), a personal media player, a mobile communication unit (e.g., a wireless phone), or other similar hardware platforms that have information processing or data storage capabilities.

In some embodiments, communication interface 1108 acts as a data communication port to provide means of communication with one or more computing systems by sending and receiving digital, electrical, electromagnetic or optical signals that carry analog or digital data streams representing various types of information, including program code. The communication may be established by way of a local or a remote network, or alternatively by way of transmission over the air or other medium, including without limitation propagation over a carrier wave.

As provided here, the disclosed software elements that are executed on the illustrated hardware elements are defined according to logical or functional relationships that are exemplary in nature. It should be noted, however, that the respective methods that are implemented by way of said exemplary software elements may be also encoded in said hardware elements by way of configured and programmed processors, application specific integrated circuits (ASICs), field programmable gate arrays (FPGAs) and digital signal processors (DSPs), for example.

Referring to FIG. 4B, software environment 1120 may be generally divided into two classes comprising system software 1121 and application software 1122 as executed on one or more hardware environments 1110. In one embodiment, the methods and processes disclosed here may be implemented as system software 1121, application software 1122, or a combination thereof. System software 1121 may comprise control programs, such as an operating system (OS) or an information management system, that instruct one or more processors 1101 (e.g., microcontrollers) in the hardware environment 1110 on how to function and process information. Application software 1122 may comprise but is not limited to program code, data structures, firmware, resident software, microcode or any other form of information or routine that may be read, analyzed or executed by a processor 1101.

In other words, application software 1122 may be implemented as program code embedded in a computer program product in form of a machine-usable or computer readable storage medium that provides program code for use by, or in connection with, a machine, a computer or any instruction execution system. Moreover, application software 1122 may comprise one or more computer programs that are executed on top of system software 1121 after being loaded from storage media 1106 into local memory 1102. In a client-server architecture, application software 1122 may comprise client software and server software. For example, in one embodiment, client software may be executed on a client computing system that is distinct and separable from a server computing system on which server software is executed.

Software environment 1120 may also comprise browser software 1126 for accessing data available over local or remote computing networks. Further, software environment 1120 may comprise a user interface 1124 (e.g., a graphical user interface (GUI)) for receiving user commands and data. It is worthy to repeat that the hardware and software architectures and environments described above are for purposes of example. As such, one or more embodiments may be implemented over any type of system architecture, functional or logical platform or processing environment.

It should also be understood that the logic code, programs, modules, processes, methods and the order in which the respective processes of each method are performed are purely exemplary. Depending on implementation, the processes or any underlying sub-processes and methods may be performed in any order or concurrently, unless indicated otherwise in the present disclosure. Further, unless stated otherwise with specificity, the definition of logic code within the context of this disclosure is not related or limited to any particular programming language, and may comprise one or more modules that may be executed on one or more processors in distributed, non-distributed, single or multiprocessing environments.

As will be appreciated by one skilled in the art, a software embodiment may include firmware, resident software, micro-code, etc. Certain components including software or hardware or combining software and hardware aspects may generally be referred to herein as a "circuit," "module" or "system." Furthermore, the subject matter disclosed may be implemented as a computer program product embodied in one or more computer readable storage medium(s) having computer readable program code embodied thereon. Any combination of one or more computer readable storage medium(s) may be utilized. The computer readable storage medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing.

In the context of this document, a computer readable storage medium may be any tangible medium that may contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that may communicate, propagate, or transport a program for use by or in connection with an instruction execution system, apparatus, or device.

Program code embodied on a computer readable storage medium may be transmitted using any appropriate medium, including but not limited to wireless, wireline, optical fiber cable, RF, etc., or any suitable combination of the foregoing. Computer program code for carrying out the disclosed operations may be written in any combination of one or more programming languages, including an object oriented programming language such as Java, Smalltalk, C++ or the like and conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Certain embodiments are disclosed with reference to flowchart illustrations or block diagrams of methods, apparatus (systems) and computer program products according to embodiments. It will be understood that each block of the flowchart illustrations or block diagrams, and combinations of blocks in the flowchart illustrations and/or block diagrams, may be implemented by computer program instructions. These computer program instructions may be provided to a processor of a general purpose computer, a special purpose machinery, or other programmable data processing apparatus to produce a machine, such that the instructions, which execute via the processor of the computer or other programmable data processing apparatus, create means for implementing the functions or acts specified in the flowchart or block diagram block or blocks.

These computer program instructions may also be stored in a computer readable storage medium that may direct a computer, other programmable data processing apparatus, or other devices to function in a particular manner, such that the instructions stored in the computer readable storage medium produce an article of manufacture including instructions which implement the function or act specified in the flowchart or block diagram block or blocks.

The computer program instructions may also be loaded onto a computer, other programmable data processing apparatus, or other devices to cause a series of operational steps to be performed on the computer, other programmable apparatus or other devices to produce a computer or machine implemented process such that the instructions which execute on the computer or other programmable apparatus provide processes for implementing the functions or acts specified in the flowchart or block diagram block or blocks.

The flowcharts and block diagrams in the figures illustrate the architecture, functionality, and operation of possible implementations of systems, methods and computer program products that are non transitory according to various embodiments. In this regard, each block in the flowchart or block diagrams may represent a module, segment, or portion of code, which comprises one or more executable instructions for implementing the specified logical functions. It should also be noted that, in some alternative implementations, the functions noted in the block may occur in any order or out of the order noted in the figures.

For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, may be implemented by special purpose hardware-based systems that perform the specified functions or acts, or combinations of special purpose hardware and computer instructions.

The claimed subject matter has been provided here with reference to one or more features or embodiments. Those skilled in the art will recognize and appreciate that, despite of the detailed nature of the exemplary embodiments provided here, changes and modifications may be applied to said embodiments without limiting or departing from the generally intended scope. These and various other adaptations and combinations of the embodiments provided here are within the scope of the disclosed subject matter as defined by the claims and their full set of equivalents.

What is claimed is:

1. A system for utilizing a controlled overlay virtualization infrastructure to facilitate communication between mirrored clients in a communications network, the system comprising:

a first virtual network client hosted on a first physical port in the physical communications network, wherein the first virtual network client is assigned a first virtual network address;

a second virtual network client hosted on a second physical port in the physical communications network, wherein the second virtual network client is a mirror copy of the first virtual network client and is assigned a second virtual network address;

a logical mirror group including the first virtual network client and the second virtual network client, wherein members of the logical mirror group are assigned a reserved virtual logical mirror network address, wherein the virtual logical mirror network address belongs to the whole logical mirror group, is associated with the first virtual network client and the second virtual network client, and is used as a destination IP address for mirroring communications between the first virtual network client and the second virtual network client;

a first overlay termination point configured to intercept data packets communicated from the first virtual network client to the second virtual network client and communicate a policy request with information related to the data packets to a network controller, wherein the communicating the policy request is based on the first overlay termination point intercepting the data packets communicated from the first virtual network client and addressed to the virtual logical mirror network address;

the network controller for determining, based on data stored in a data structure, that a second overlay termination point is associated with the second physical port, for determining, based on data stored in the data structure, that the second virtual network client is hosted on the second physical port, for determining, based on data stored in the data structure, the virtual network address of the second virtual network client, and for sending a policy response to the first overlay termination point with instructions to replace the data packets with new data packets for the second virtual network client, wherein the new data packets include the second virtual network address as a destination address and include the virtual logical mirror network address as a source address; and a second overlay termination point configured to receive the new data packets from the first overlay termination point and submit the new data packets to the second virtual network client;

wherein the first overlay termination point sends the new data packets to the second overlay termination point in response to receiving the policy response.

2. The system of claim 1, wherein the first virtual network client targets mirrored network traffic to a logical mirror address.

3. The system of claim 1, wherein the first overlay termination point receives a data packet from the first virtual network client, wherein the data packet includes the logical mirror address as a destination address.

4. The system of claim 3, wherein the first overlay termination point, responsive to receiving the data packet, communicates a policy request to the network controller, wherein the policy request includes a logical network identifier and data packet header information.

5. The system of claim 4, wherein the network controller responsive to receiving the policy request, examines the packet header information and in view of mapping data included in the data structure, determines the virtual network address of the second virtual network client and a physical network address of the second overlay termination point.

6. The system of claim 5, wherein the network controller communicates a policy response to the first overlay termination point, wherein the policy response includes the virtual network address of the second virtual network client and the physical network address of the second overlay termination point.

7. The system of claim 6, wherein the first overlay termination point communicates the updated data packet to the second overlay termination point over the physical network using the physical network address included in the policy response generated by the network controller.

8. The system of claim 7, wherein responsive to receiving the updated data packet, the second overlay termination point determines that the data packet is to be forwarded to the second virtual network client based on the second virtual network address included in the updated data packet.

9. The system of claim 8, wherein the second overlay termination point forwards the data packet to the second virtual network client.

10. A method for utilizing a controlled overlay virtualization infrastructure to facilitate communication between mirrored clients in a communications network, the method comprising:
a first overlay termination point intercepting data packets communicated from the first virtual network client to the second virtual network client and communicating a policy request with information related to the data packets to a network controller, wherein the communicating the policy request is based on the first overlay termination point intercepting the data packets communicated from the first virtual network client and addressed to the virtual logical mirror network address;
wherein a first virtual network client is hosted on a first physical port in the physical communications network and is assigned a first virtual network address;
a second virtual network client is hosted on a second physical port in the physical communications network, wherein the second virtual network client is a mirror copy of the first virtual network client and is assigned a second virtual network address; and
a logical mirror group includes the first virtual network client and the second virtual network client, wherein members of the logical mirror group are assigned a reserved virtual logical mirror network address, wherein the virtual logical mirror network address belongs to the whole logical mirror group, is associated with the first virtual network client and the second virtual network client, and is used as a destination IP address for mirroring communications between the first virtual network client and the second virtual network client;
wherein a network controller is configured for determining the virtual network address of the second virtual network client and a physical network address of the second overlay termination point based on mapping data stored in a data structure and routing packets to a virtual network address of the second virtual network client, and sending a policy response to the first overlay termination point with instructions to replace the data packets with new data packets for the second virtual network client; and
wherein a second overlay termination point is configured to receive data packets from the first overlay termination point and submit the data packets to the second virtual network client.

11. The method of claim 10, wherein the first virtual network client targets mirrored network traffic to a logical mirror address.

12. The method of claim 10, wherein the first overlay termination point receives a data packet from the first virtual network client, wherein the data packet includes the logical mirror address as a destination address.

13. The method of claim 12, wherein the first overlay termination point, responsive to receiving the data packet, communicates a policy request to the network controller, wherein the policy request includes a logical network identifier and data packet header information.

14. A computer program product comprising a computer readable storage medium having a computer readable program, wherein the computer readable program when executed on a computer causes the computer to:
have a first overlay termination point intercepting data packets communicated from the first virtual network client to the second virtual network client and communicate the data packets to a network controller;
wherein a first virtual network client is hosted on a first physical port in the physical communications network and is assigned a first virtual network address;
have a second virtual network client hosted on a second physical port in the physical communications network, which is a mirror copy of the first virtual network client and is assigned a second virtual network address; and
have a logical mirror group which includes the first virtual network client and the second virtual network client, wherein members of the logical mirror group are assigned a reserved virtual logical mirror network address wherein the virtual logical mirror network address belongs to the whole logical mirror group, is associated with the first virtual network client and the second virtual network client, and is used as a destination IP address for mirroring communications between the first virtual network client and the second virtual network client;
have a network controller configured for examining the packet header information and in view of mapping data included in the data structure, determining the virtual network address of the second virtual network client and for sending a policy response to the first overlay termination point with instructions to replace the data packets with new data packets for the second virtual network client;
wherein a second overlay termination point is configured to receive data packets from the first overlay termination point and submit the data packets to the second virtual network client; and
wherein the first overlay termination point sends the new data packets to the second overlay termination point in response to receiving the policy response.

15. The computer program product of claim 14, wherein the first virtual network client targets mirrored network traffic to a logical mirror address.

16. The computer program product of claim 14, wherein the first overlay termination point receives a data packet from the first virtual network client, wherein the data packet includes the logical mirror address as a destination address.

17. The computer program product of claim 16, wherein the first overlay termination point, responsive to receiving the data packet, communicates a policy request to the network controller, wherein the policy request includes a logical network identifier and data packet header information.

* * * * *